P. A. COMBS.
CLUTCH.
APPLICATION FILED MAY 3, 1917.
1,300,819. Patented Apr. 15, 1919.
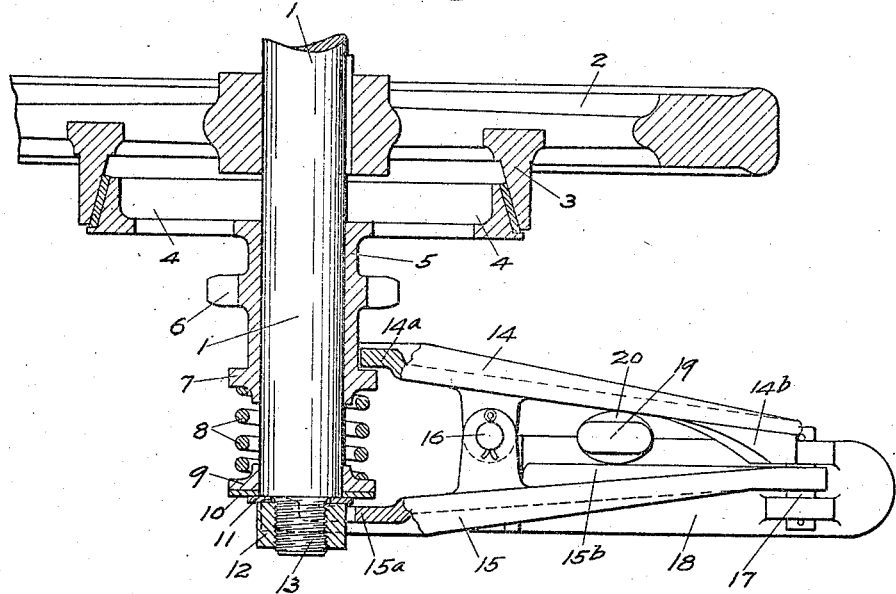
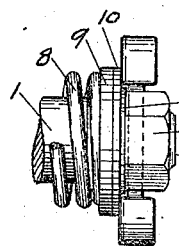 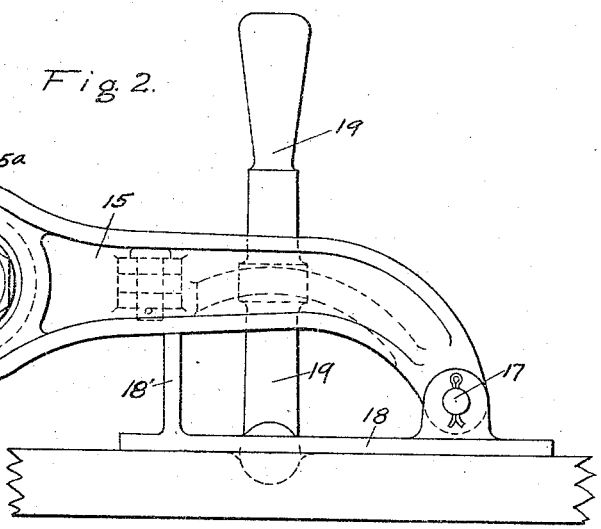
Perley A. Combs, Inventor.
By _____ Atty.

UNITED STATES PATENT OFFICE.

PERLEY A. COMBS, OF PORTLAND, OREGON, ASSIGNOR TO BEAVER STATE MOTOR CO., OF GRESHAM, OREGON, A CORPORATION OF OREGON.

CLUTCH.

1,300,819. Specification of Letters Patent. Patented Apr. 15, 1919.

Application filed May 3, 1917. Serial No. 166,182.

*To all whom it may concern:*

Be it known that I, PERLEY A. COMBS, a citizen of the United States, residing in the city of Portland, county of Multnomah, and State of Oregon, have invented certain new and useful Improvements in Clutches, of which the following is a specification—

My invention relates to clutches, and more particularly to an improved means for operating a clutch member, and it has among its salient objects to provide a clutch construction in which the movable clutch member can be moved out of engagement with a driven clutch element on the shaft without any end thrust on said shaft, thus providing what might be termed a floating, clutch-operating mechanism.

Another object of my invention is to provide a simple and practical leverage mechanism for operating said clutch.

In order to more clearly explain my improved clutch, I have illustrated the preferred form thereof on the accompanying sheet of drawings, which I will now describe.

Figure 1 is a horizontal sectional view of a clutch embodying my invention;

Fig. 2 is an end view showing the clutch-operating mechanism; and

Fig. 3 is a fragmentary end view, looking at the left hand side of Fig. 2.

Referring now more in detail to the drawings, 1 designates the driving shaft to which is keyed a wheel 2, having a concentrically arranged clutch element 3, made as a part thereof and driven therewith. Slidably mounted on said shaft 1, is a movable clutch element 4, formed as a part of a bearing sleeve 5, provided with a driving element 6, here shown as a sprocket and having at its opposite end a bearing flange, or shoulder, 7, against which bears a coiled spring 8, the opposite end of which spring bears against a bearing collar 9, also loosely mounted on said shaft. A washer 10, is mounted on said shaft and bears against said collar 9 at one side, and at its other side it bears against the flange 11 of a nut 12, threaded on to the reduced end 13, of the shaft 1. Said spring 8 operates to normally hold the movable clutch 4 in driving engagement with the driven clutch element 3, said spring bearing outwardly at one end against the collar 9, and inwardly at its other end against the flange 7.

I will now describe the means for moving the movable clutch element 4 out of driving engagement with the driven clutch element 3.

Two lever members 14 and 15 are pivotally connected to each other, as at 16, and provided at their corresponding ends with yoke-like bearing portions 14ª and 15ª, which bear, respectively, against the outside of the washer 10 and the inner side of the bearing flange or shoulder 7 of the movable clutch member. The opposite end of the lever 15, is pivotally and loosely connected, as at 17, to a base plate 18, one end of which may be turned up, as at 18', to form a rest or support for the levers 14 and 15, as shown. The pivotal connection of lever 15 to the pin 17 is sufficiently loose to permit the movement of said lever slightly laterally in either direction on the support 18', the hole through said lever being slightly larger than the pin 17 for this purpose. Pivotally mounted in said base plate 18, is a lever 19, having a cam portion 20 at each side thereof, which operates between the ends of the levers 14 and 15, whereby, when said lever 19, is moved to the right in Figs. 1 and 2, the ends of said levers 14 and 15 are separated, while their opposite ends are moved toward each other, which operation also moves the bearing collar 9, and the clutch bearing flange, or shoulder, 7, toward each other, compressing the spring 8, and thus moving the movable clutch element 4, out of driving engagement with the driven clutch element 3, without any end thrust on the shaft 1. I prefer to provide the levers 14 and 15, on their inner faces with cam portions, as 14ᵇ and 15ᵇ, between which the cam portion 20 of the lever 19 moves for spreading said levers 14 and 15.

I am aware that changes in details can be made in my invention without departing from the spirit thereof, and I do not, therefore, limit the invention to the embodiment thereof here shown for purposes of illustration, except as I may be limited by the hereto appended claims.

I claim:

1. In a clutch, in combination, a driving shaft, a driven clutch element secured thereto, a movable clutch element slidably mounted on said shaft, a bearing member slidably mounted on said shaft, a spring interposed between said movable clutch element and said bearing element and operating to normally move them apart on said shaft, a pair of operating levers, one of which operates on said movable clutch element and the other of which operates on said movable bearing element, and a pivoted lever moving in a plane between said operating levers and having a cam action therewith for forcing the bearing portions of said levers toward each other, whereby to move said movable clutch member and said bearing element toward each other on said shaft.

2. In a clutch, in combination, a driving shaft, a driven clutch element secured thereto, a movable clutch element slidably mounted on said shaft and movable into and out of driving engagement with said driven clutch element, a bearing collar slidably mounted on said shaft, a spring interposed between said movable clutch element and said bearing collar, a pair of operating levers pivotally mounted intermediate their ends and connected at their corresponding ends, respectively, with said movable clutch element and said movable bearing collar, and a pivoted lever moving in a plane between said operating levers and having a cam action therewith operating between the opposite ends of said levers to force them apart, whereby to move said movable clutch element and said bearing collar toward each other on said shaft.

3. In a clutch, in combination, a driving shaft, a driven clutch element secured thereto, a movable clutch element slidably mounted on said shaft and movable into and out of driving engagement with said driven clutch element, a bearing collar slidably mounted on said shaft, a spring interposed between said movable clutch element and said bearing collar, a pair of operating levers pivotally mounted intermediate their ends and connected at their corresponding ends, respectively, with said movable clutch element and said movable bearing collar, and a cam lever pivotally mounted between the opposite ends of said levers and operable therebetween to move them apart, whereby to move said movable clutch element and said bearing collar toward each other on said shaft.

4. In a clutch, in combination, a shaft, a clutch element driven thereby, a second clutch element movable on said shaft into and out of driving engagement with said driven clutch element, a bearing member on said shaft, a pair of operating levers pivotally mounted intermediate their ends with their corresponding ends operatively connected, respectively, with said second clutch element and said bearing member, one of said levers being anchored at its opposite end and means operating between the opposite ends of said levers for moving them relative to each other, whereby to move their opposite ends and said second clutch member and said bearing member relative to each other.

Signed at Portland, Multnomah county, Oregon, this 27th day of April, 1917.

PERLEY A. COMBS.

In presence of—
I. M. GRIFFIN.

Copies of this patent may be obtained for five cents each, by addressing the "Commissioner of Patents, Washington, D. C."